No. 741,972. PATENTED OCT. 20, 1903.
W. R. MALCOLM.
WATER GAGE.
APPLICATION FILED APR. 28, 1903.
NO MODEL.
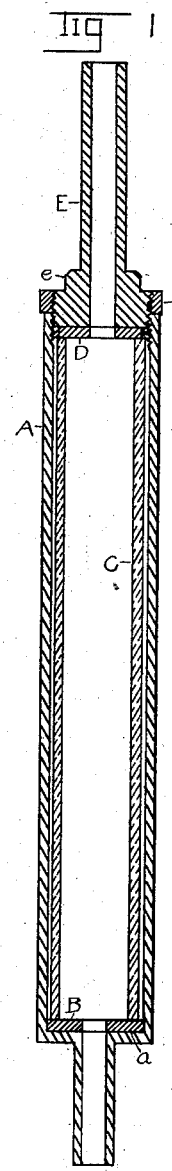
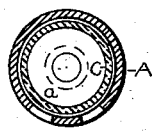
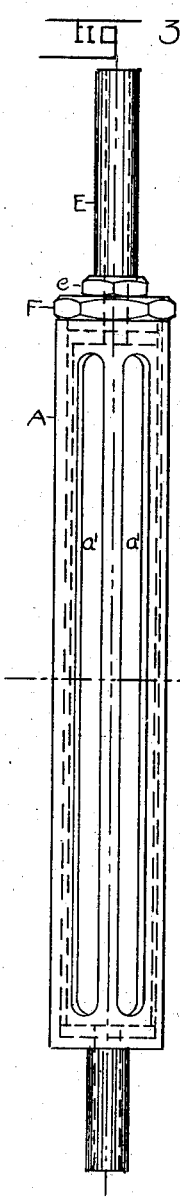
WITNESSES
INVENTOR No. 741,972. Patented October 20, 1903.

UNITED STATES PATENT OFFICE.

WALTER R. MALCOLM, OF ALBANY, NEW YORK.

WATER-GAGE.

SPECIFICATION forming part of Letters Patent No. 741,972, dated October 20, 1903.

Application filed April 28, 1903. Serial No. 154,661. (No model.)

*To all whom it may concern:*

Be it known that I, WALTER R. MALCOLM, a citizen of the United States, residing at Albany, in the county of Albany and State of New York, have invented certain new and useful Improvements in Water-Gages; and I do hereby declare the following to be a full, clear, and exact description of the invention, such as will enable others skilled in the art to which it appertains to make and use the same.

My invention relates to water-gages adapted to be used on steam-boilers, and particularly on the boilers of locomotives which are subjected to constant vibration when in use; and my invention has for its object to provide means for securely fastening a water-glass in its holder and protecting such a glass from breakage. In the water-gages now in use on the boilers of locomotives the glass frequently becomes broken by the jolting and vibration of the locomotive, and hot water is blown out into the cab of the engine from the water-gage, to the great danger and frequent injury of the engineer and fireman. Such disadvantages I overcome by means of the device illustrated in the accompanying drawings, in which—

Figure 1 is a vertical longitudinal section of a device embodying my invention. Fig. 2 is a transverse horizontal section taken on line 1 1 of Fig. 3, and Fig. 3 is a side elevation of such a device.

As illustrated in the drawings, A represents an outer casing or shell provided with vertical slots $a'$ and a reduced lower end on which is formed a ledge or shoulder $a$, upon which rests a washer B of any suitable yielding substance, but preferably of lead. A glass tube C is arranged within the casing A, and its lower end rests on the washer B. A corresponding washer D rests upon the upper end of the glass tube C. The upper end of the casing A is provided with an interior thread which engages a corresponding outer thread formed on a head E. The head E is provided with a stem having an opening communicating with the interior of the glass tube C. The outer thread of the head E also engages the interior thread of a nut F, which extends over and is adapted to bear against the upper edge of the casing A.

The glass tube C is made of sufficient thickness to stand a considerable strain and pressure applied longitudinally, and when in its place within the casing the head E is screwed down firmly onto the glass tube, thereby forcing the upper and lower ends of the tube into the upper and lower washers, so as to make a water-tight joint at the upper and lower ends of the tube. A nut $e$ is preferably formed on the head E, whereby the head E may be conveniently screwed down onto the tube.

After the head has been brought down firmly onto the tube, so as to force the ends thereof into the washers at the upper and lower ends of the tube, the nut F is screwed down firmly onto the upper edge of the casing and made as tight as possible. The head E is by such means held firmly in place and is prevented from becoming loose and breaking the water-tight joints formed by the washers with the ends of the tube, yet the great strain which holds the head in place is exerted by the nut F on the upper edge of the casing and not on the tube itself. In such manner all the pressure or strain necessary to hold the head in its place in the casing is obtained without any unnecessary or injurious strain on the tube.

What I claim as new, and desire to secure by Letters Patent, is—

In a water-gage, the combination with an outer casing interiorly threaded at one end and provided with an interior shoulder on its opposite end, of a glass tube supported on one end by said shoulder, a washer of yielding material bearing against said shoulder and the end of said tube, a washer of yielding material bearing against the opposite end of said tube, a head provided with an exterior thread engaging the interior thread of the casing and adapted to exert a pressure on said washers and tube, a threaded nut engaging the thread of said head and adapted to bear against the end of said casing, substantially as shown and described.

In testimony whereof I affix my signature in presence of two witnesses.

WALTER R. MALCOLM.

Witnesses:
ROBERT W. HARDIE,
EDWARD KAESTNER.